Figure 1:
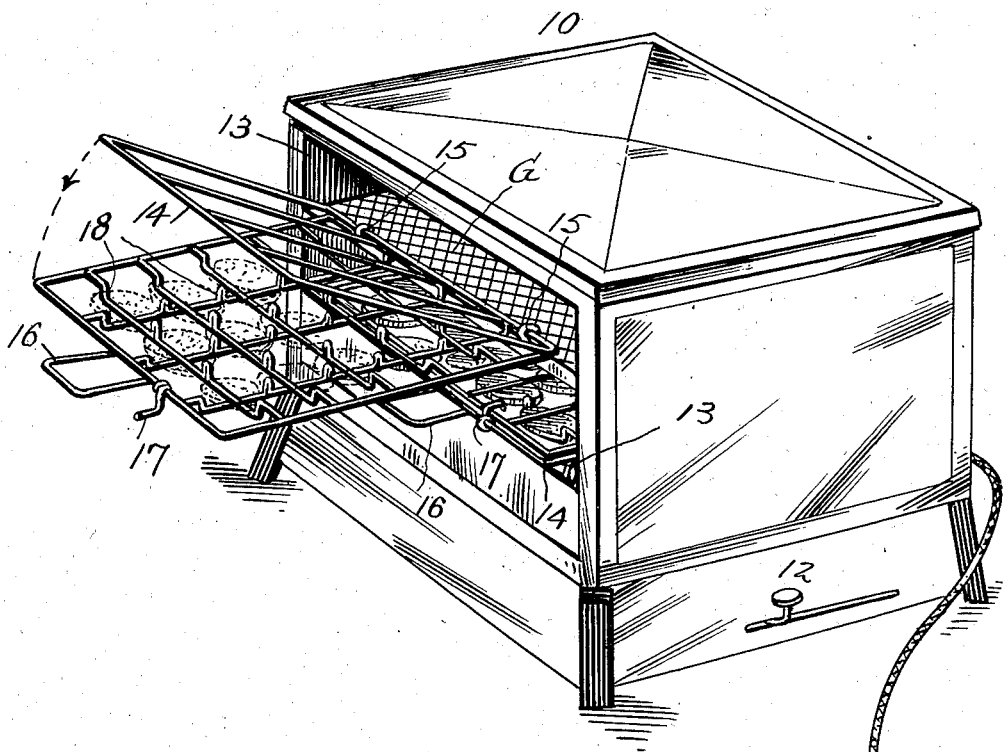

Jan. 21, 1936.　　　　C. KEMP　　　　2,028,159

TOASTER FOR CANAPES FOR HORS D'ŒUVRES

Filed March 12, 1934

Inventor
Caroline Kemp,
Chas. J. Williamson
By
Attorney

Patented Jan. 21, 1936

2,028,159

UNITED STATES PATENT OFFICE 2,028,159

TOASTER FOR CANAPÉS FOR HORS D'OEUVRES

Caroline Kemp, Clayton, N. Y.

Application March 12, 1934, Serial No. 715,200

6 Claims. (Cl. 53—5)

My invention is concerned with the toasting of canapés for hors d'oeuvre which are small, thin pieces of bread to receive food delicacies that constitute hors d'oeuvre. Because of the thinness and small size of the pieces of bread, and particularly the thinness thereof, toasting with the ordinary appliances and particularly electric toasters is troublesome and unsatisfactory in its results because the thin bread slices under the influence of the toasting heat twist or warp when it is required that they shall be flat to serve their food-holding purpose and the bending or warping sometimes is to an extent which places the edges of the slice in contact with or too close to the heating elements of the toaster, with the result that the toasting is uneven and the edges are burnt. That type of electric toaster which comprises a bread-receiving chamber with opposite walls that contain the electric heating elements has such wide spacing of such opposite walls as will readily receive an ordinary slice of bread of substantial thickness and that circumstance provides the conditions above set forth which contribute to the warping or twisting of thin small slices of bread for hors d'oeuvre use, and as has just been pointed out, it is undesirable to have close contact of the edges of the thin bread slices with the heating elements because that results in burning them at the edges. The problem presented for solution was the utilization of the ordinary or conventional household electric toaster satisfactorily to toast small pieces or slices of bread so thin as to bend or warp from the effect of the heat. My solution of this problem is a provision of means for maintaining the thin slices of bread in substantially the original flat state thereof, the prevention of contact of either side with the electrical heating element when two such elements are employed spaced apart opposite one another. Another problem is the convenient and easy placing in the electric toaster of the small thin pieces of bread and the removal therefrom of the toasted bread, considering the difficulties of placing and removing such small objects and in a considerable number in and removing them from the toaster, and by my invention, I accomplish by the one instrumentality or means, the solution of both problems. My invention will, therefore, be found to comprehend a toaster provided with means for the easy and convenient handling of a substantial number of small thin pieces of bread or toast and for preventing warping of the thin pieces and uneven toasting or burning thereof.

My invention consists in whatever is described by or is included within the terms or scope of the appended claims.

In the drawing:

Figure 1 is a perspective view of an electric toaster embodying my invention and of a construction having two horizontal toasting chambers one above the other and each provided with the instrumentality for handling numerous small pieces of thin bread and maintaining them flatwise during the toasting operation, one of such instrumentalities, or devices, being shown ready to be thrust into the toasting chamber.

Figure 2:
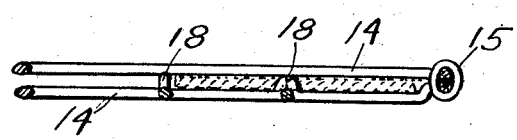

Fig. 2 is a detail view in vertical section.

The electric toaster 10, shown in the drawing has a cord and plug 11, for connection with a source of electricity and a switch 12, for cutting the toaster in and out of circuit; and it has two horizontal toasting chambers 13, one above the other, each having at top and bottom heating elements as usual and a grid, or open-work guard G to prevent contact of slices of bread or other objects within the chamber and the electrical heating elements, these things not being necessary to illustrate in the drawing as they are usual in electric toasters.

For each of the chambers 13, I provide an insertable and removable bread and toast-carrier 14 of open-work construction to afford access of heat to the bread to be toasted and capable of confining by top and bottom contact with the thin slices of bread such slices and with enough pressure thereon to prevent warping or bending and thus maintain them in their original, flat state, and preferably the holder is so formed that each particular piece of bread (which may be of disc-form) is restrained from sidewise movement or displacement when in the holder, as for example, by the provision in the holder of a cell-like device for each individual slice of bread, found, for example by spaced vertical bends 18, in the bottom wires.

The holder 14, as shown comprises two parts, an upper and a lower part, or a bottom and top, made of wire, each in the form of a rectangular frame, and preferably the two frames are pivoted together at one edge by a hinge device 15, so that they may be opened apart for the placing of the pieces of bread between them and their subsequent removal and closing together to clamp, so to speak, the pieces of bread between them when the holder is thrust into one of the chambers 13. The frames may be formed of cross wires spaced apart suitable distances and the wires of the bottom may be bent down or depressed at intervals to provide the individual cells for the separate pieces of bread, but the wires of the top may be straight, since their function is merely to bear upon top sides of the bread slices or pieces. The frame is provided with a suitable handle 16 at the front edge or opposite the hinged edges and preferably a latch 17 is provided to hold the two frame parts in bread clamping position. Preferably as shown in Fig. 2 the sets of cross wires of the bottom lie in the same plane so that the pieces of bread lie flat, the tops of such wires and the bottoms of the holders wires 14, being spaced uniformly substantially the thickness of the piece of bread, the latter being indicated by dotted lines in Fig. 2.

It will be seen that the toaster embodying my invention has in the bread holder what in reality is a supplemental removable and replaceable toasting chamber that, so to speak, constitutes a reducer for the normal size toasting chamber and at the same time constitutes a transporter or carrier for the small thin slices of bread before and after toasting.

What I claim is:

1. A toaster having a chamber adapted to receive toasting heat from a suitable source and a removable and replaceable holder for bread to be toasted in the form of thin small pieces, said holder comprising top and bottom members adapted to exert clamping contact upon opposite sides of the pieces of bread said holder having a large number of individual cells that are open towards the heating means of the toaster to give direct access of toasting heat to the individual small pieces of bread in the cells the bread pieces contacting portions of the top and bottom members being spaced apart a distance corresponding substantially with the thickness of the pieces.

2. A toaster having a chamber adapted to receive toasting heat from a suitable source and a removable and replaceable holder for bread to be toasted in the form of thin small pieces, said holder comprising top and bottom members adapted to exert clamping contact upon opposite sides of the pieces of bread, said holder having individual cells for the respective pieces of bread said cells having at the sides elements that have limited contact with the side edges of the pieces of bread to restrain them from lateral movement and the cells being open towards the heating means of the toaster to expose substantially the whole surface of the pieces to direct access of toasting heat the bread pieces contacting portions of the top and bottom members being spaced apart a distance corresponding substantially with the thickness of the pieces.

3. A toaster as in claim 2 in which the holder top and bottom are formed of wire frames, one of them having its wires at intervals bent to provide the individual cells.

4. A toaster having a bread-receiving chamber that receives toasting heat and a bread holder therein and removable therefrom having opposite spaced apart walls that respectively simultaneously contact with opposite sides of the slices of bread to be toasted, said walls being movable relative to one another for the placing of bread slices to be toasted and the removal of the toasted bread and are perforated to a substantial extent adjacent each piece of bread to expose the pieces there between to direct access of heat from the toaster the spaced apart walls that contact with opposite sides of the slices of bread to be toasted being spaced apart a distance substantially equal to the thickness of the pieces of bread.

5. A toaster having means for supplying heat for toasting, a grid form support opposite the heating means, a holder for bread to be toasted in the form of thin small pieces, said holder comprising spaced opposing members adapted to exert clamping contact upon opposite sides of the pieces of bread placed there between, said holder having a large number of individual cells that are open towards the heating means of the toaster to give direct access of toasting heat to the individual small pieces of bread in the cells, and holder supporting means situated to support the holder with numerous small pieces of bread opposite the grid said opposing piece clamping members being spaced apart a distance corresponding substantially with the thickness of the pieces of bread, and the individual cell completely isolating the piece of bread therein from the pieces in all the other cells.

6. As a means for toasting at one time a number of small thin pieces of bread such as are used in hors d'oeuvre, a toaster having means for supplying toasting heat simultaneously to a large number of such pieces of bread, means for supporting at one time such pieces of bread removably in position and in separated side by side relation, for the bread to directly receive toasting heat, comprising relatively movable opposed bread clamping members each having bearings in permanent fixed relation that simultaneously engage the separated pieces of bread, that maintain such pieces in their original flat form, and against lateral movement, while such pieces are being subjected to toasting heat.

CAROLINE KEMP.